United States Patent
George et al.

(10) Patent No.: US 9,363,656 B1
(45) Date of Patent: Jun. 7, 2016

(54) SECTOR BASED WIRELESS DEVICE MANAGEMENT

(71) Applicant: Sprint Communications Company L.P., Overland Park, KS (US)

(72) Inventors: Kenneth V. George, Houston, TX (US); Ehtesham Khan, Santa Clara, CA (US); Timothy J. Stechert, Evergreen, CO (US); Dominick Mangiardi, Fremont, CA (US); Mark J. Bonn, Granite Bay, CA (US); James D. Kirby, San Mateo, CA (US)

(73) Assignee: Sprint Communications Company L.P., Overland Park, KS (US)

(*) Notice: Subject to any disclaimer, the term of this patent is extended or adjusted under 35 U.S.C. 154(b) by 79 days.

(21) Appl. No.: 14/189,133

(22) Filed: Feb. 25, 2014

(51) Int. Cl.
*H04M 11/04* (2006.01)
*H04W 4/22* (2009.01)

(52) U.S. Cl.
CPC ........................................ *H04W 4/22* (2013.01)

(58) Field of Classification Search
CPC ................................ H04W 4/22; H04W 24/00
USPC .................................................. 455/404, 457
See application file for complete search history.

(56) References Cited

U.S. PATENT DOCUMENTS

2009/0319180 A1    12/2009  Robinson et al.
2010/0328093 A1*   12/2010  Robinson et al. ........ 340/825.49

FOREIGN PATENT DOCUMENTS

EP            2001251 A1 * 12/2008 ............... H04Q 7/38

* cited by examiner

*Primary Examiner* — Allahyar Kasraian
*Assistant Examiner* — Farid Seyedvosoghi (57) ABSTRACT

Examples disclosed herein provide systems, methods, and software for monitoring wireless communication devices within a geographic area of interest. In one example, a method of operating a location analytics system includes identifying a geographic area of interest. The method further includes identifying wireless sectors within the geographic area of interest, and identifying wireless communication devices within the wireless sectors. The method also includes generating mapping information for the geographic area of interest based on the identification of the wireless communication devices, and providing the mapping information to emergency action system to provide information to the devices.

20 Claims, 5 Drawing Sheets

SECTOR BASED WIRELESS DEVICE MANAGEMENT

TECHNICAL BACKGROUND

Wireless communication devices are common for individuals in modern society, allowing the users to connect with others and receive data from various networked devices. A typical wireless communication system includes systems to provide wireless access across a geographic region, with wireless coverage areas associated with individual wireless access nodes. The wireless access systems exchange user communications between wireless devices, service providers, and other end user devices. The user communications typically include voice calls, data exchanges, web pages, streaming media, or text messages, among other communication services.

In some examples, the wireless devices are used to receive news from various sources, such as commercial news services or government entities. These devices allow information to reach a large amount of people using preexisting devices and infrastructure. Accordingly, during times of emergency, the wireless communication devices may be an essential tool in providing people information and instructions.

OVERVIEW

Examples disclosed herein provide systems and methods for monitoring wireless communication devices within a geographic area of interest. In one example, a method of operating a location analytics system includes determining a geographic area of interest, and identifying one or more wireless sectors covering the geographic area of interest. The method further includes identifying a plurality of wireless communication devices in each of the one or more wireless sectors, and generating mapping information for the plurality of wireless communication devices relative to the geographic area of interest. The method also includes transferring the mapping information to an emergency action system.

In another instance, a method for operating a location analytics system includes determining a geographic area of interest, and identifying one or more wireless sectors covering the geographic area of interest. The method further includes identifying a plurality of wireless communication devices in each of the one or more wireless sectors for a first period of time, and identifying a subsequent plurality of wireless communication devices in each of the one or more wireless sectors for a second period of time. The method also includes generating mapping information for the plurality of wireless communication devices and the subsequent plurality of wireless communication devices relative to the geographic area of interest, and transferring the mapping information to an emergency action system.

In another occurrence, a system for managing wireless communication devices within a geographic area of interest includes a location analytics system configured to determine the geographic area of interest, and identify one or more wireless sectors covering the geographic area of interest. The location analytics system is further configured to transfer a device identification request to one or more base stations configured to provide the one or more wireless sectors, and receive identifiers for a plurality of wireless communication devices from the one or more base stations. The location analytics system is also configured to generate mapping information for the plurality of wireless communication devices relative to the geographic area of interest, and provide the mapping information to an emergency action system. The system further includes the one or more base stations configured to receive the device identification request, and transfer the identifiers for the plurality of wireless communication devices.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Wireless devices, such as smart telephones, laptop computers, tablet computers, and the like are essential to providing information to the end users of the corresponding device. In operation, the device may connect to nodes or base stations, which in turn allow the device to communicate with other wireless devices or networked computing elements. Further, these wireless communications allow the device access to a variety of services in including email, file sharing, or news related updates.

In the present example, a location analytics system is configured to manage emergency location services for a plurality of wireless communication devices. To accomplish this task, the location analytics system is configured to determine a geographic area of interest. In some examples, this area of interest may be specified by an emergency action system that is configured to receive input about weather, tenor, natural disaster, or other possible emergencies. Once the input is gathered, a geographic area of interest is determined based on the input. For example, a flood may be approaching a specific town, and as a result the town may be flagged as a geographic area of interest that is passed to the location analytics system.

Once the area of interest is determined, the location analytics system is configured to identify wireless sectors that service the location. These sectors may be provided by any number of base stations or nodes, and may provide the wireless devices with a variety of data communications. Further, the base stations may be configured to identify the devices communicating over the identified wireless sectors and provide the identification information to the location analytics system. In turn, the location analytics system may generate mapping information for the identified wireless devices based on the location of the sector within the geographic area of interest.

In response to determining the mapping information, the location analytics system is configured to pass the mapping information to the emergency action system. In some examples, the mapping information may be used to display concentrations of devices within the geographic area of interest. For instance, the mapping information may display that most of the devices are stuck at a bridge crossing point or other point of interest. Once the mapping information is received, the emergency action system is configured to identify emergency action information based on the mapping information. Such emergency action information may include passing directions to the wireless devices in the affected area, sending emergency services to the higher concentrated locations in the geographic area of interest, or any other course of action based on the mapping information. In some occurrences, the emergency action information may be determined by an automated system within the emergency action system. In other examples, an administrator of the emergency action system may identify the emergency action information.

Further, in some occurrences, the location analytics system may be configured to gather supplemental mapping information based on the movement of the devices over time. For instance, the analytics system may generate first mapping information based on first locations of the wireless devices in the communication sectors. At some point after the generation of the first mapping information, the analytics system may again query the base stations to identify the connecting wireless devices. This second query may then be used in generating the supplemental mapping information by the location analytics system.

Based on the supplemental mapping information, the movement of the wireless devices can be monitored to determine further points of interest. These further points of interest may include sectors where large numbers of devices have moved, sectors where the devices have remained stationary despite a threat, or any other point of interest based on movement. Further, the movement of the devices may also be monitored to ensure that instructions passed to the wireless devices are followed. For example, if the emergency action system directs a subset of wireless devices to a certain location, the supplemental mapping information can be used to monitor if the subset of wireless devices migrate to that location.

Figure 1:
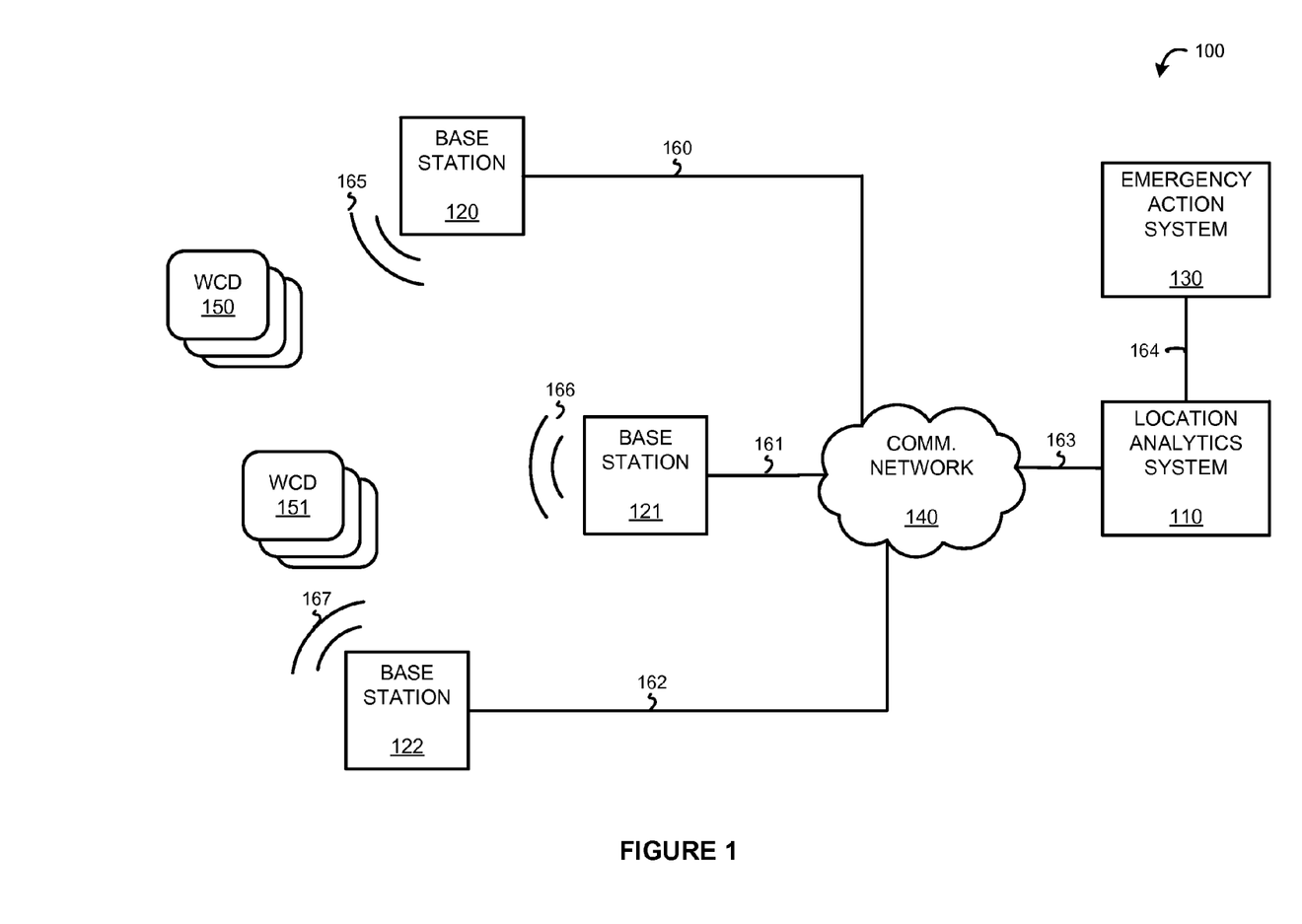
FIG. 1 illustrates a wireless communication system for providing location information to an emergency action system.

Referring now to FIG. 1, FIG. 1 illustrates a communication system 100 for monitoring devices within wireless sectors. Communication system 100 includes location analytics system 110, base stations 120-122, emergency action system 130, communication network 140, and wireless communication devices (WCDs) 150-151. Communication network 140 is configured to communicate with base stations 120-122 over communication links 160-162. Location analytics system is configured to communicate with communication network 140 over communication link 163, and communicate with emergency action system 130 over communication link 164. Base stations 120-122 are used to provide wireless communications to WCDs 150-151 over wireless sectors 165-167.

In operation, base stations 120-122 are configured to provide communication services to WCDs 150-151. Such communication services may include email, file sharing, voice, or news related updates. These base stations are configured to communicate with location analytics system 110 over communication network 140. Location analytics system 110 is configured to monitor locations for wireless devices within wireless communication network and provide this information to emergency action system 130. In response, emergency action system 130 is configured to communicate with various wireless devices within the system to provide emergency information. Such information may include directions for the users of the wireless devices, more information about the emergency in the form of a text message or other alert, or any other information to the wireless devices.

Figure 2:
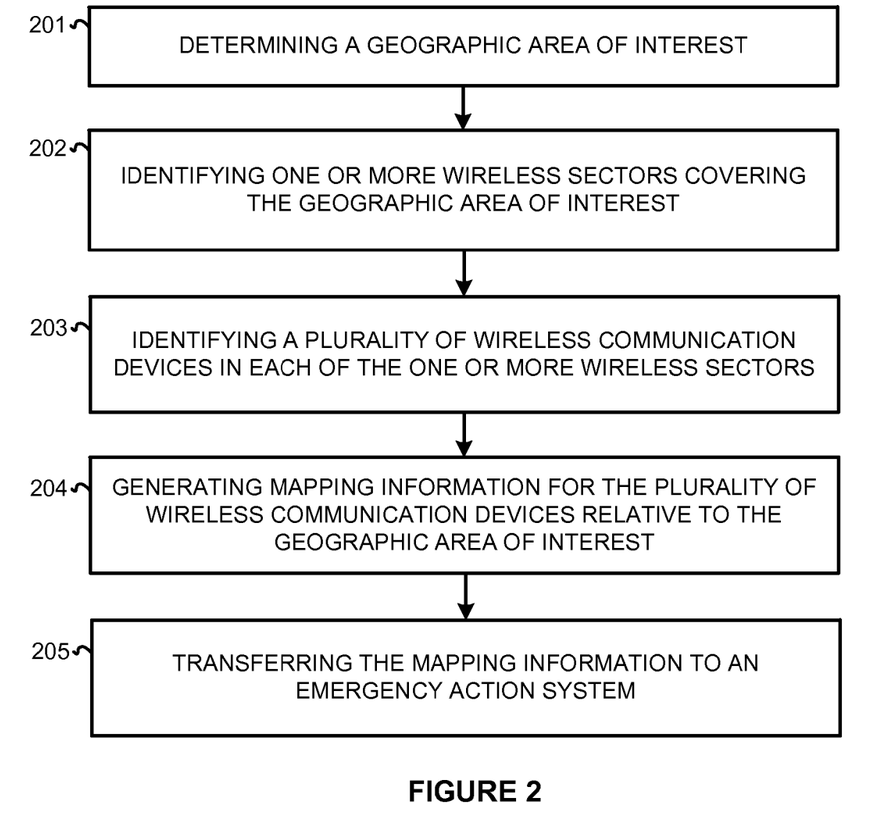
FIG. 2 illustrates a method of operating a wireless communication system to provide location information to an emergency action system.

To further illustrate the operation of communication system 100, FIG. 2 is included. FIG. 2 illustrates a method of operating location analytics system 110 to monitor device locations based on sectors. The method includes determining a geographic area of interest (201). In some examples, this geographic area of interest may be specified by emergency action system 130 in response to an emergency situation. An emergency situation may include a natural disaster, a terrorist threat, or any other possible emergency situation. Based on the location of the emergency, a user or an automated system within emergency action system 130 may specify the particular geographic area of interest.

Once the area is identified, location analytics system 110 is configured to identify one or more wireless sectors covering the geographic area of interest (202). As illustrated in system 100, these wireless sectors are represented by sectors 165-167 and are used to provide communication services to WCDs 150-151. In response to the sectors being identified, base stations 120-122 are configured to assist location analytics system 110 in identifying the devices that are present within each of the sectors (203). For example WCDs 150 may be present within sector 165, but WCDs 151 may be present within sector 167. Based on the identification of the devices, location analytics system 110 is configured to generate mapping information for the plurality of wireless communication devices relative to the geographic area of interest (204).

In some examples, the mapping information may comprise a map of the plurality of wireless devices within each of the sectors. From this map, points of interest may be included, such as typical travel routes for users, possible dangerous obstacles, or any other point of interest. Accordingly, the mapping information may provide a correlation between the devices in the sectors and possible issues with the points of interest.

Once the mapping information is generated, it may then be passed or transferred to emergency action system 130 for further analysis (205). In some instances, emergency action system 130 is configured to take the mapping information and identify possible issues for the users based on the mapping information. For example, if a large number of users are congregated in a single location, it may be a sign that there is an issue with user movement. Such movement issues may be caused if a road is damaged or a bridge is unavailable to the users of the devices.

Accordingly, based on the issues identified for each of the sectors, emergency action system 130 may provide instructions or other emergency action information to the devices within the influenced sectors. For example, emergency action system may identify that a roadway or other path is blocked in a specific sector. In response to the identification, emergency action system 130 may transmit a message or other notification to devices in that sector, and direct the devices to alternative location.

In some examples, location analytics system 110 may be configured to gather supplemental information from the various identified sectors within the geographic area of interest. This supplemental information about the devices may be used in updating the mapping information to illustrate movement of devices within the system. Referring to FIG. 1 as an example, wireless communication devices 150 may initially be identified within wireless sector 165. However, when the base stations are polled at a later time the WCDs 150 may be identified within wireless sector 167. As such, the mapping information may reflect these changes, and may be used by emergency action system 130 to identify problems in the movement of the devices. The identified problems may then be addressed by transferring messages to the identified devices.

Figure 3:
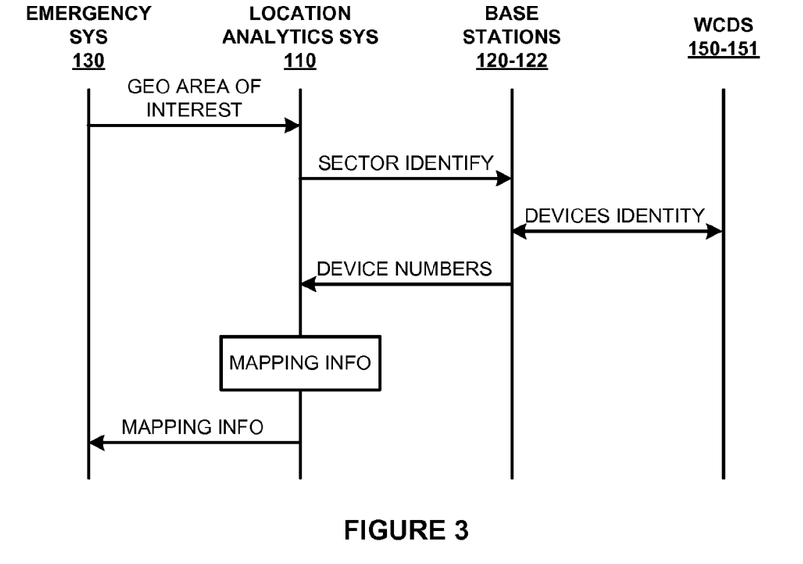
FIG. 3 illustrates a timing diagram for providing and managing location information for a geographic area of interest

To further illustrate the wireless system of FIG. 1, FIG. 3 is included. FIG. 3 illustrates a timing diagram for monitoring devices in wireless sectors. As illustrated, emergency system 130 may be configured to transfer a geographic area of interest to location analytics system 110. From this area of interest, location analytics system 110 is configured to identify wireless sectors that service the geographic area. Once determined, location analytics system 110, along with base stations 120-122, is configured to identify wireless devices within each of the sectors.

Based on the device identifications, location analytics system 110 is configured to determine mapping information based on the device locations in the geographic area. This mapping information may be used to present a visual representation of the devices within the geographic area based on the coverage provided by the various sectors. This may allow an administrator or automated system at emergency action system 130 to develop emergency action information.

Referring back to FIG. 1, Base stations 120-122 comprise RF communication circuitry and an antenna. The RF communication circuitry typically includes an amplifier, filter, RF modulator, and signal processing circuitry. Base stations 120-122 may each also comprise a router, server, memory device, software, processing circuitry, cabling, power supply, network communication interface, structural support, or some other communication apparatus.

Location analytics system 110 may comprise any computing system configured to manage the locations of wireless devices within a geographic area of interest. Location analytics system 110 may include processing systems, user interfaces, communication interfaces, storage systems, or other similar computing elements.

Emergency action system 130 is any device or group of devices configured to manage emergency situations based on device locations. Emergency action system 130 may include processing systems, user interfaces, communication interfaces, storage systems, or other similar computing elements.

Communication network 140 comprises network elements that provide communications services to wireless devices 150-151 through base stations 120-122. Communication network 140 may comprise switches, wireless access nodes, Internet routers, network gateways, application servers, computer systems, communication links, or some other type of communication equipment—including combinations thereof.

Wireless communication devices 150-151 each comprise Radio Frequency (RF) communication circuitry and an antenna. The RF communication circuitry typically includes an amplifier, filter, modulator, and signal processing circuitry. Wireless communication devices 150-151 may also include a user interface, memory device, software, processing circuitry, or some other communication components. Each of wireless communication devices 150-151 may be a telephone, computer, e-book, mobile Internet appliance, wireless network interface card, media player, game console, or some other wireless communication apparatus—including combinations thereof.

Wireless sectors 165-167 include wireless links that use the air or space as the transport media. The wireless links may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 160-164 use metal, glass, air, space, or some other material as the transport media. Communication links 160-164 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 160-164 could be direct links or may include intermediate networks, systems, or devices.

Figure 4:
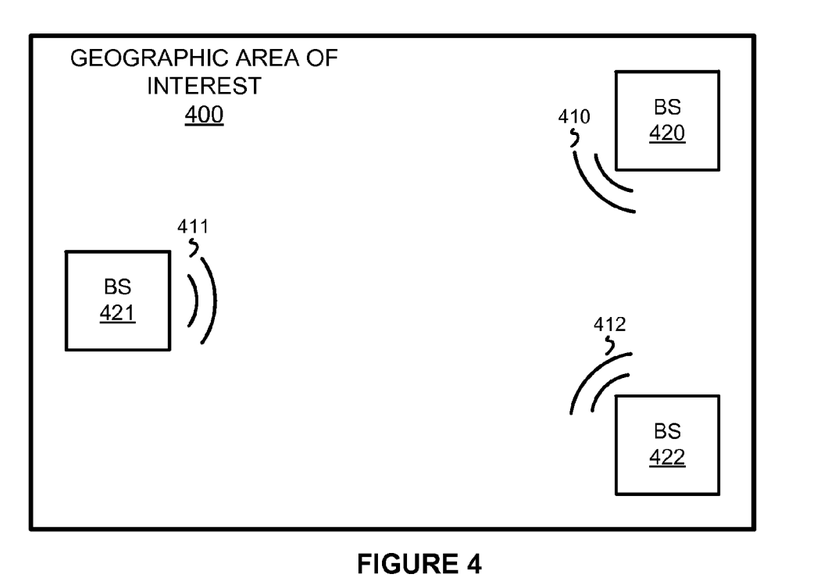
FIG. 4 illustrates a geographic area of interest with a plurality of wireless sectors.

Turning now to FIG. 4, FIG. 4 illustrates a geographic area of interest 400 according to one example. FIG. 4 further includes base stations 420-422 and wireless sectors 410-412. In operation, a location analytics system, such as location analytics system 110, may be configured to identify wireless sectors that provide communications within geographic area of interest 400. This area of interest may be specified by the location analytics system or may be identified by an emergency action system. Once the sectors are identified, in this example sectors 410-412, the base stations are configured to assist the location analytics system with identifying wireless devices that connect over the sectors.

In response to identifying the devices, the location analytics system is configured to determine mapping information based on the sectors and connected devices. For example, devices that are connecting over wireless sector 411 would be in a different location than the devices that are communicating over sector 410. This mapping information may then be used to give a visual representation of the devices within geographic area of interest 400.

Although illustrated with three base stations in the present example, it should be understood that any number of base stations might exist in the area of interest. Further, although each base station is illustrated as providing a single wireless sector, it should be understood that the base stations might provide any number of wireless sectors to the communication devices.

Figure 5:
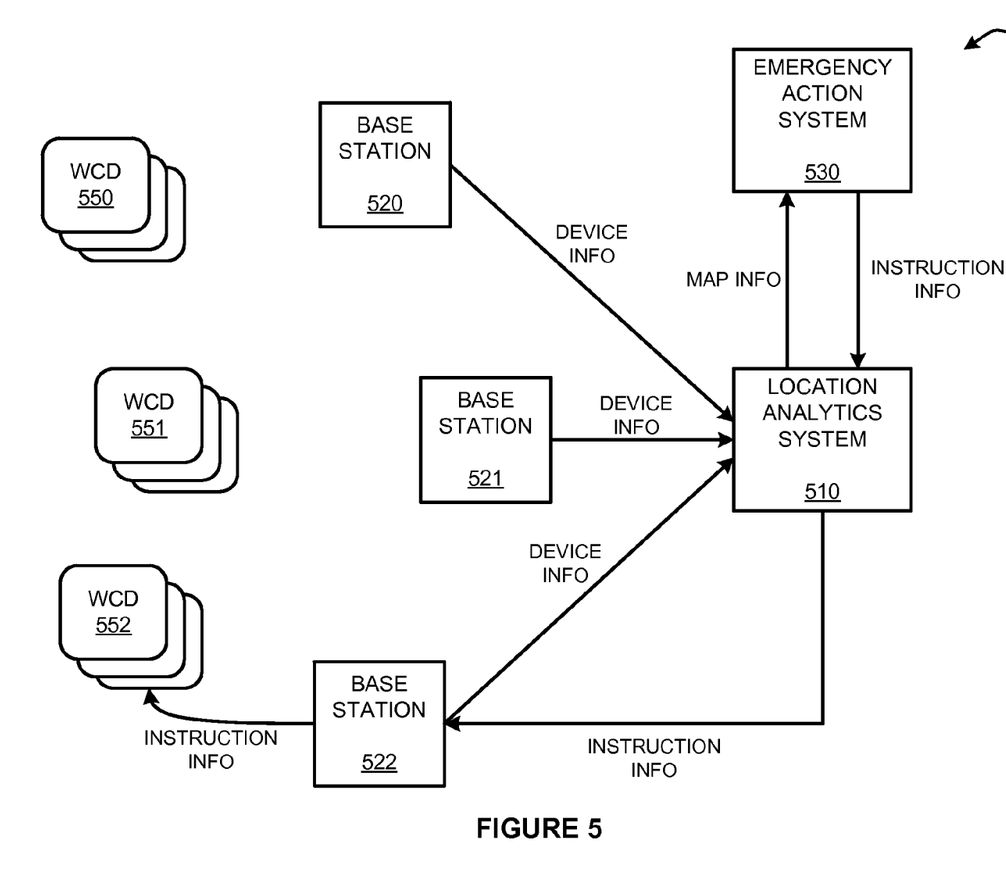
FIG. 5 illustrates an overview of operating a communication system to manage location information for a geographic area of interest.

FIG. 5 illustrates an overview 500 of operating a communication system to manage location information for a geographic area of interest. Overview 500 includes location analytics system 510, base stations 520-522, emergency action system 530, and wireless communication devices 550-552.

In operation, base stations 520-522 are configured to provide wireless communications over wireless sectors. Accordingly, the base stations may be configured to identify the devices that are present within each of the wireless sectors. Using the present example, location analytics system 510 may identify wireless sectors in an area of interest provided by each of base stations 520-522, and gather device identification information from the base stations. Once information is gathered for the devices, location analytics system 510 can generate mapping information for the wireless devices. Such mapping information may include geographic information about the sectors, the number of devices in each of the sectors, or any other relevant information.

Once the mapping information is determined, the information is transferred to emergency action system 530. Emergency action system 530 is configured to receive the mapping information and determine instruction information for one or more of the wireless devices within the area of interest. Referring to the example in overview 500, base station 520 may provide a wireless sector to WCDs 550, base station 521 may provide a wireless sector to WCDs 551, and base station 522 may provide a wireless sector to WCDs 552. Based on the mapping information that is provided by location analytics system 510, emergency action system 530 may determine that emergency action information may need to be delivered to the devices in the sector provided by base station 522. Such action information may include movement directions for the users of the wireless devices, further information about an emergency situation, or any other type of information that may be useful to the users of WCDs 552. To deliver the instruction information, emergency action system 530 is configured to transfer the information to location analytics system 510. In response, location analytics system 510 passes the information to base station 522, which in turn transmits the information to the appropriate wireless devices.

Although the present example illustrates mapping information based on a single location of the wireless devices, it should be understood that location analytics system 510 might monitor the movement of the devices over time. To accomplish this task, base stations 520-522 within the area of interest may be configured to identify the connecting devices at multiple instances. As a result, the mapping information that is provided to the emergency action system may illustrate the movement of devices between sectors in the area of interest. Further, the mapping information may identify the number of devices that leave the area of interest or the devices that show no movement over time.

Figure 6:
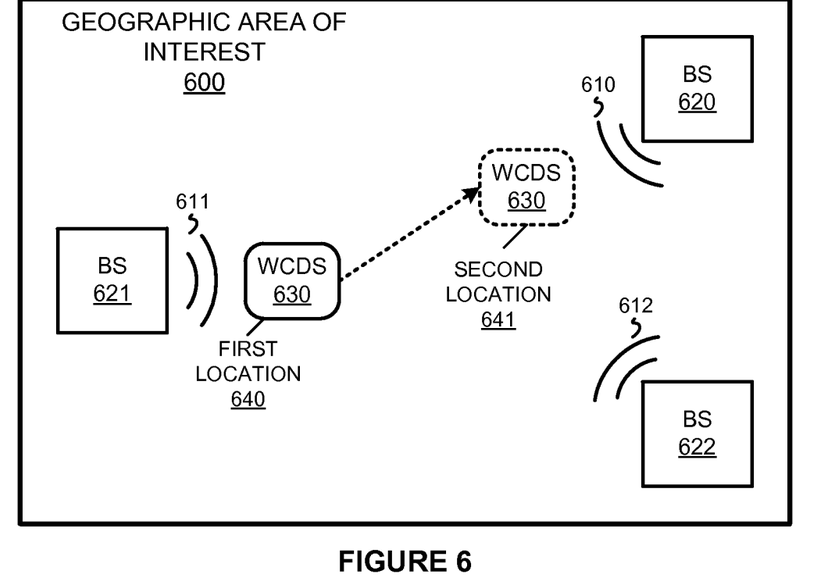
FIG. 6 illustrates the movement of wireless devices within a geographic area of interest.

Referring now to FIG. 6, FIG. 6 illustrates the movement of wireless devices within a geographic area of interest. FIG. 6 includes geographic area of interest 600, base stations 620-622, and wireless communication devices (WCDs) 630.

In operation, a location analytics system is configured to determine a geographic area of interest, such as area of interest 600. This area may be defined by the location analytics system, or may be passed to the location analytics system by an emergency action system. Once the area is determined, the location analytics system is configured to determine wireless sectors 610-612 that are provided in geographic area of interest 600 by base stations 620-622. In response to identifying the sectors, base stations 620-622 are configured to identify the devices within the sectors to assist the location analytics system in generating mapping information.

In the present example, the location analytics system is configured to monitor the movement of wireless communication devices within geographic area of interest 600. To accomplish this task, base stations 620-622 may be configured to identify first locations 640 for WCDs 630. Once the first locations are determined, the wireless devices may migrate in response to emergency action instructions, in response to an emergency event, or for any other reason. Accordingly, base stations 620-622 are configured to identify a second location 641 for WCDs 630. As illustrated in geographic area of interest 600, WCDs 630 may initially communicate with base station 621 over wireless sector 611, but after migration may communicate with base station 620 over wireless sector 610. From this change in wireless sectors, the location analytics system may generate mapping information that can be used in monitoring the movement of the wireless devices.

In some instances, once the mapping information is generated, the mapping information is passed to an emergency action system. This emergency action system may be an automated system that responds or makes decisions based on the mapping information, or may be operated by an administrator that makes decisions based on the mapping information. In some examples, the emergency action system is configured to provide emergency action information to the wireless devices based on the mapping information. Such information may include instructions to the users of the wireless devices, more information about an emergency to the wireless devices, or any other relevant emergency information. The location analytics system may then monitor the devices to determine how they respond to the instructions provided by the emergency system.

Figure 7:
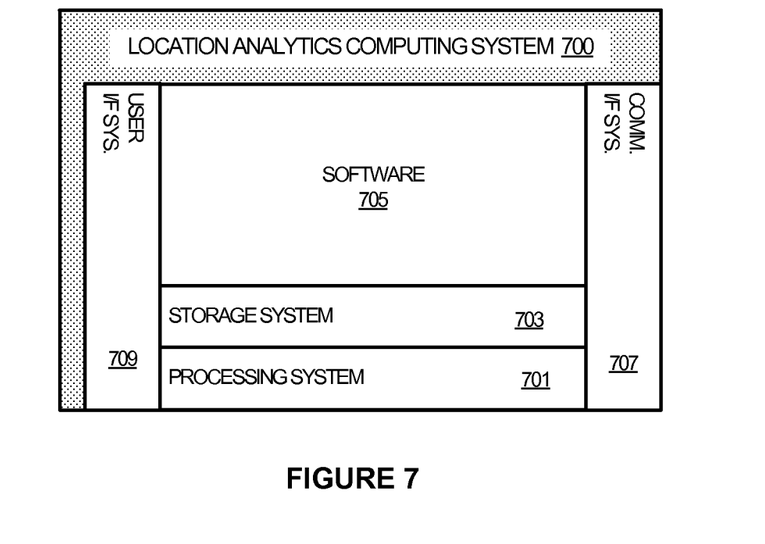
FIG. 7 illustrates a location analytics computing system for identifying device locations within a geographic area of interest.

FIG. 7 illustrates a location analytics computing system 700 for generating mapping information based on device locations. Computing system 700 is representative of a computing system that may be employed in any computing apparatus, system, or device, or collections thereof, to suitably implement location analytics system 110 and location analytics system 510. Computing system 700 may be employed in server computers, desktop computers, or any other similar computing device.

Computing system 700 includes processing system 701, storage system 703, software 705, communication interface system 707, and user interface system 709. Processing system 701 is operatively coupled with storage system 703, communication interface system 707, and user interface system 709. Processing system 701 loads and executes software 705 from storage system 703. When executed by processing system 701, software 705 directs processing system 701 to operate as described herein as a location analytics system for generating mapping information for a geographic area of interest. Computing system 700 may optionally include additional devices, features, or functionality not discussed here for purposes of brevity.

Referring still to FIG. 7, processing system 701 may comprise a microprocessor and other circuitry that retrieves and executes software 705 from storage system 703. Processing system 701 may be implemented within a single processing device, but may also be distributed across multiple processing devices or sub-systems that cooperate in executing program instructions. Examples of processing system 701 include general-purpose central processing units, application specific processors, and logic devices, as well as any other type of processing device, combinations, or variation.

Storage system 703 may comprise any computer readable storage media readable by processing system 701 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 703 may also include communication media over which software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 701 or possibly other systems.

Software 705 may be implemented in program instructions and among other functions may, when executed by processing system 701, direct processing system 701 to operate as a location analytics system described herein by FIGS. 1-6. In particular, the program instructions may include various components or modules that cooperate or otherwise interact to carry out the mapping operations described in FIGS. 1-6. The various components or modules may be embodied in compiled or interpreted instructions, or in some other variation or combination of instructions. The various components or modules may be executed in a synchronous or asynchronous manner, in a serial or in parallel, in a single threaded environment or multi-threaded environment, or in accordance with any other suitable execution paradigm, variation, or combination thereof. Software 705 may include additional processes, programs, or components, such as operating system software, hypervisor software, or other application software. Software 705 may also comprise firmware or some other form of machine-readable processing instructions executable by processing system 701.

For example, if the computer-storage media are implemented as semiconductor-based memory, software 705 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 700 is generally intended to represent a system on which software 705 may be deployed and executed in order to implement a location analytics system from FIGS. 1-6 (or variations thereof). However, computing system 700 may also be suitable for any computing system on which software 705 may be staged and from where software 705 may be distributed, transported, downloaded, or otherwise provided to yet another computing system for deployment and execution, or yet additional distribution.

In one example, computing system 700 is configured to determine a geographic area of interest to develop mapping information. This geographic area may be determined by computing system 700 or by an emergency information system that is configured to respond to emergency or other similar situations. Once the area is determined, computing system 700 identifies wireless sectors within the area of interest and identifies wireless devices within these sectors. Upon identification of the wireless devices, mapping information can be generated to assist in emergency response and may be passed to an emergency action system.

In some instances, the mapping information may comprise visual maps that allow an administrator or some other user to identify problem spots or locations of interest within the area of interest. For example, if a large amount of devices are congregated in one location, an administrator may deduct that there is a problem with the movement of the devices or that a path is blocked. As such, the administrator may specify an alternative route for the devices to dissipate the congestion by sending emergency action information to the influenced devices.

In an alternative instance, the mapping information may be provided to an automated emergency action system that is configured to determine issues within the area of interest. Based on algorithms or other predefined processes, the automated system may determine emergency action information to be passed to the users. This information may include directions, further information about the emergency, or any other relevant information for the users of the devices.

Further, computing system 700 may be configured to identify device locations over a plurality of instances. This may allow mapping information to be generated that illustrates the movement of the devices within the geographic area of interest. Accordingly, an emergency action system may be provided with a more accurate determination of device location and movement within the area.

Referring still to FIG. 7, communication interface system 707 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 709, which may be omitted in some examples, may include a mouse, a voice input device, a touch input device for receiving a touch gesture from a user, a motion input device for detecting non-touch gestures and other motions by a user, and other comparable input devices and associated processing elements capable of receiving user input. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here. User interface system 709 may also include associated user interface software executable by processing system 701 in support of the various user input and output devices discussed above. Separately, or in conjunction with each other and other hardware and software elements, the user interface software and devices may support a graphical user interface, a natural user interface, or any other suitable type of user interface.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a location analytics system, the method comprising:
   determining a geographic area of interest with a plurality of wireless communication devices;
   identifying a plurality of wireless sectors covering the geographic area of interest;
   identifying a subset of the plurality of wireless communication devices in each wireless sector of the plurality of wireless sectors;
   generating mapping information, wherein the mapping information comprises locations of the plurality of wireless communication devices in the geographic area of interest based on the identified subsets of the plurality of wireless communication devices in the plurality of wireless sectors; and transferring the mapping information to an emergency action system.

2. The method of claim 1 wherein determining the geographic area of interest comprises receiving the geographic area of interest from the emergency action system.

3. The method of claim 1 further comprising:
receiving emergency action information for a second subset of the plurality of wireless communication devices; and
initiating transfer of the emergency action information to the second subset of the plurality of wireless communication devices.

4. The method of claim 3 wherein receiving the emergency action information comprises receiving the emergency action information from the emergency action system.

5. The method of claim 3 wherein the emergency action information comprises directions to users of the second subset of the plurality of wireless communication devices.

6. The method of claim 3 wherein the emergency action information comprises emergency status information.

7. The method of claim 3 wherein initiating transfer of the emergency action information to the second subset of the plurality of wireless communication devices comprises:
transferring the emergency action information to base stations providing wireless coverage to the second subset of the plurality of wireless communication devices.

8. The method of claim 1 further comprising:
after generating the mapping information, identifying a subsequent subset of the plurality of wireless communication devices in each wireless sector of the plurality of wireless sectors;
generating subsequent mapping information, wherein the subsequent mapping information comprises location information of the plurality of wireless communication devices in the geographic area of interest based on the identified subsequent subsets of the plurality of wireless communication devices in the plurality of wireless sectors; and
transferring the subsequent mapping information to the emergency action system.

9. The method of claim 1 further comprising:
after generating the mapping information, identifying a subsequent subset of the plurality of wireless communication devices in each wireless sector of the plurality of wireless sectors;
identifying sector movement information for the plurality of wireless communication devices based on the identified subsets of the plurality of wireless communication devices in the plurality of wireless sectors and the identified subsequent subsets of the plurality of wireless communication devices in the plurality of wireless sectors;
generating subsequent mapping information, wherein the subsequent mapping information comprises the sector movement;
transferring the subsequent mapping information to the emergency action system.

10. The method of claim 1 wherein identifying the subset of the plurality of wireless communication devices in each wireless sector of the plurality of wireless sectors comprises:
transferring a device identification request to one or more base stations configured to provide the plurality of wireless sectors; and
receiving identifiers for the plurality of wireless communication devices from the one or more base stations.

11. A method of operating a location analytics system, the method comprising:
determining a geographic area of interest with a plurality of wireless communication devices;
identifying a plurality of wireless sectors covering the geographic area of interest;
at a first time, identifying a subset of the plurality of wireless communication devices in each wireless sector of the plurality of wireless sectors;
at a second time after the first time, identifying a subsequent subset of the plurality of wireless communication devices in each wireless sector of the plurality of wireless sectors;
generating mapping information, wherein the mapping information comprises sector movement information for the plurality of wireless communication devices based on the identified subsets of the plurality of wireless communication devices in the plurality of wireless sectors and the identified subsequent subsets of the plurality of wireless communication devices in the plurality of wireless sectors; and
transferring the mapping information to an emergency action system.

12. The method of claim 11 wherein the mapping information further comprises locations of the plurality of wireless communication devices in the geographic area of interest based on the identified subsets of the plurality of wireless communication devices in the plurality of wireless sectors and the identified subsequent subsets of the plurality of wireless communication devices in the plurality of wireless sectors.

13. The method of claim 11 further comprising:
receiving emergency action information for a second subset of the subsequent plurality of wireless communication devices; and
initiating transfer of the emergency action information to the second subset of the subsequent plurality of wireless communication devices.

14. A system to manage location information for a plurality of wireless communication devices comprising:
a location analytics system configured to:
determine the geographic area of interest;
identify a plurality of wireless sectors covering the geographic area of interest;
transfer a device identification request to one or more base stations configured to provide the plurality of wireless sectors;
receive, from the one or more base stations, identifier information that indicates a subset of the plurality of wireless communication devices in each wireless sector of the plurality of wireless sectors;
generate mapping information, wherein the mapping information comprises locations of the plurality of wireless communication devices in the geographic area of interest based on the identifiers; and
transfer the mapping information to an emergency action system; and
the one or more base stations configured to:
receive the device identification request; and
transfer the identifier information.

15. The system of claim 14 wherein determining the geographic area of interest comprises receiving the geographic area of interest from the emergency action system.

16. The system of claim 14 wherein the location analytics system is further configured to:

receive emergency action information for a second subset of the plurality of wireless communication devices; and initiate transfer of the emergency action information to the second subset of the plurality of wireless communication devices.

17. The system of claim 16 wherein the location analytics system configured to receive emergency action information is configured to receive the emergency action information from the emergency action system.

18. The system of claim 16 wherein the emergency action information comprises directions to users of the second subset of the plurality of wireless communication devices.

19. The system of claim 16 wherein the location analytics system configured to initiate transfer of the emergency action information to the second subset of the plurality of communication devices is configured to transfer the emergency action information to base stations providing wireless coverage to the second subset of the plurality of wireless communication devices.

20. The system of claim 14 further comprising:
the location analytics system configured to:
transfer a subsequent device identification request to the one or more base stations configured to provide the plurality of wireless sectors;
receive, from the one or more base stations, subsequent identifier information that indicates a second subset of the plurality of wireless communication devices in each wireless sector of the plurality of wireless sectors; and
wherein the mapping information comprises sector movement information for the plurality of wireless communication devices based on the identifier information and the subsequent identifier information.

* * * * *